United States Patent
Edelman et al.

(10) Patent No.: US 8,091,336 B2
(45) Date of Patent: Jan. 10, 2012

(54) METHOD TO INITIATE MULTIPLE CHAMBER DETONATION WAVE COMBUSTORS

(75) Inventors: Raymond B. Edelman, Woodland Hills, CA (US); Herbert R. Lander, Westlake Village, CA (US); Jeffrey H. Hunt, Chatsworth, CA (US)

(73) Assignee: Pratt & Whitney Rocketdyne, Inc., Canoga Park, CA (US)

(*) Notice: Subject to any disclaimer, the term of this patent is extended or adjusted under 35 U.S.C. 154(b) by 3161 days.

(21) Appl. No.: 09/737,029

(22) Filed: Dec. 14, 2000

(65) Prior Publication Data

US 2008/0087010 A1    Apr. 17, 2008

(51) Int. Cl.
*F02K 7/02* (2006.01)
*F02C 7/264* (2006.01)

(52) U.S. Cl. .......... 60/247; 60/39.76; 60/39.821; 431/1

(58) Field of Classification Search .......... 60/212, 60/247, 39.76, 39.78, 39.821; 431/1; 102/201
See application file for complete search history.

(56) References Cited

U.S. PATENT DOCUMENTS

| | | | | |
|---|---|---|---|---|
| 4,377,997 A | | 3/1983 | Staerzl | 123/418 |
| 4,391,195 A | * | 7/1983 | Shann | 102/201 |
| 4,416,226 A | | 11/1983 | Nishida et al. | 123/143 B |
| 5,367,869 A | | 11/1994 | DeFreitas | 60/39.06 |
| 5,404,820 A | * | 4/1995 | Hendrix | 102/201 |
| 5,579,633 A | | 12/1996 | Hunter et al. | 60/204 |
| 5,615,548 A | * | 4/1997 | Winfree et al. | 60/247 |
| 5,864,517 A | | 1/1999 | Hinkey et al. | 367/145 |
| 5,873,240 A | * | 2/1999 | Bussing et al. | 60/207 |
| 5,937,635 A | | 8/1999 | Winfree et al. | 60/39.38 |
| 6,382,957 B1 | * | 5/2002 | Early et al. | 431/1 |
| 6,394,788 B1 | * | 5/2002 | Early et al. | 431/1 |
| 6,439,503 B1 | * | 8/2002 | Winfree et al. | 244/53 R |
| 6,477,829 B1 | * | 11/2002 | Hunter et al. | 60/247 |
| 6,514,069 B1 | * | 2/2003 | Early et al. | 431/1 |

FOREIGN PATENT DOCUMENTS

GB    2063964    *    6/1981

* cited by examiner

*Primary Examiner* — Michael Carone
*Assistant Examiner* — Joseph W Sanderson
(74) *Attorney, Agent, or Firm* — Carlson Gaskey & Olds, P.C.

(57) ABSTRACT

A pulse detonation wave engine (PDWE) detonation system provides for optical ignition. The detonation system has a plurality of detonation banks, where each detonation bank has a plurality of detonation chambers for receiving a fuel/oxidizer mixture from a propellant source. An optical ignition subsystem generates a plurality of optical pulses. The detonation system also has an optical transport subsystem for transporting the optical pulses from the ignition subsystem to the chambers, where the optical pulses ignite each fuel/oxidizer mixture such that the chambers detonate in a desired order. This allows the banks to be sequentially detonated and the chambers within each bank to be simultaneously detonated, without the increased tankage and toxic ignition associated with conventional approaches.

25 Claims, 2 Drawing Sheets

METHOD TO INITIATE MULTIPLE CHAMBER DETONATION WAVE COMBUSTORS

BACKGROUND OF THE INVENTION

1. Field of the Invention

The present invention generally relates to propulsion systems. More particularly, the invention relates to a pulse detonation wave engine detonation initiation system having an optical ignition subsystem.

2. Technical Background

Modern day propulsion systems are used in both aerospace and military applications for a number of different purposes. For example, the aerospace industry typically requires propulsion systems to operate in a "rocket" mode (i.e. carrying oxidizer on-board) in order to drive large boost vehicles as well as smaller upper stage systems. Similarly, the defense industry generally requires propulsion systems to operate in an "air breathing" mode in order to drive missiles, etc. Additionally, a mixed system could use an air-breathing first stage and a rocket-mode upper stage for space access. Thus, propulsion systems can be used for high mass payloads as well as in situations where the payload is dominated by the fuel/oxidizer mass being used by the propulsion system. Traditionally, steady flow engines have been used in each of these types of applications. The pulse detonation wave engine (PDWE) uses, however, an alternative type of detonation cycle to achieve the same propulsion results.

The primary component of the PDWE is the combustion chamber (or detonation tube). The PDWE represents an attractive propulsion source since its engine cycle is thermodynamically closest to that of a constant volume reaction. As such, it is a minimum entropy generating device. This characteristic leads to the inference that a maximum of the potential energy of the PDWE is put into thrust and not into flow work. Thus, it follows that in order to increase thrust in this type of engine, the volume must be increased. Early approaches to the PDWE therefore focused on increasing the volume of a single combustion chamber.

More recently, the technical community has increasingly adopted the alternative choice of increasing total volume by designing the engine to include a set of banks of smaller combustion chambers. This technique, however, increases the complexity of the ignition subsystem because the inter-chamber timing must be considered.

Current approaches to igniting the PDWE have involved separate shock or blast wave initiators and chemical additives designed to enhance detonability. The blast wave detonator approach involves the use of a predetonation chamber connected to the main chamber. The predetonation chamber uses oxygen instead of air to increase reactivity and transmits a "blast wave" into the main chamber for ignition purposes. A particular difficulty associated with this technique is that the separate chamber leads to increased volume and weight. In air-breathing applications, special tanking is required for the oxygen. Furthermore, since the modern PDWE has a number of banks and chambers, ignition timing can be problematic. It is therefore desirable to provide a PDWE that does not rely upon shock wave detonation.

Highly reactive additives have also been used with the more traditional spark ignited PDWE as well as with the shock wave detonation technique. Additives work via a chemical reactivity enhancement mechanism and can be either mixed in with the fuel or added to the combustion chamber separately. Mixing the additive in with the fuel presents storage problems, while adding the additive in separately increases tankage.

SUMMARY OF THE INVENTION

The above and other objectives are provided by a pulse detonation wave engine (PDWE) detonation system in accordance with the present invention. The detonation system has a plurality of detonation banks, where each detonation bank has a plurality of detonation chambers for receiving a fuel/oxidizer mixture from fuel/oxidizer sources. An optical ignition subsystem generates a plurality of optical pulses, where the optical pulses ignite the fuel/oxidizer mixture such that the chambers detonate in a desired order. The detonation system also has an optical transport subsystem for transporting the optical pulses from the optical ignition subsystem to the chambers. The use of optical ignition and transport provides a non-toxic, small, lightweight, precisely controlled detonation system.

Further in accordance with the present invention, an optical ignition subsystem for a PDWE detonation system is provided. The ignition subsystem has an optical energy source for generating optical energy at a predetermined intensity level. An optical multiplexing device separates the optical energy such that the optical energy can sequentially detonate banks of the detonation system and can simultaneously detonate chambers contained within each bank. The ignition subsystem further includes an optical interface for optically coupling the energy source to the multiplexing device.

Further in accordance with the present invention, a method for detonating a PDWE is provided. The method includes the steps of transporting a fuel/oxidizer mixture from the propellant source to a plurality of detonation banks, where each detonation bank has a plurality of detonation chambers. A plurality of optical pulses are generated, where the optical pulses ignite each fuel/oxidizer mixture such that the chambers detonate in a desired order. The method further provides for transporting the optical pulses to the chambers.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one of ordinary skill in the art by reading the following specification and sub-joined claims and by referencing the following drawings, in which:

DETAILED DESCRIPTION OF THE PREFERRED EMBODIMENTS

Figure 1:
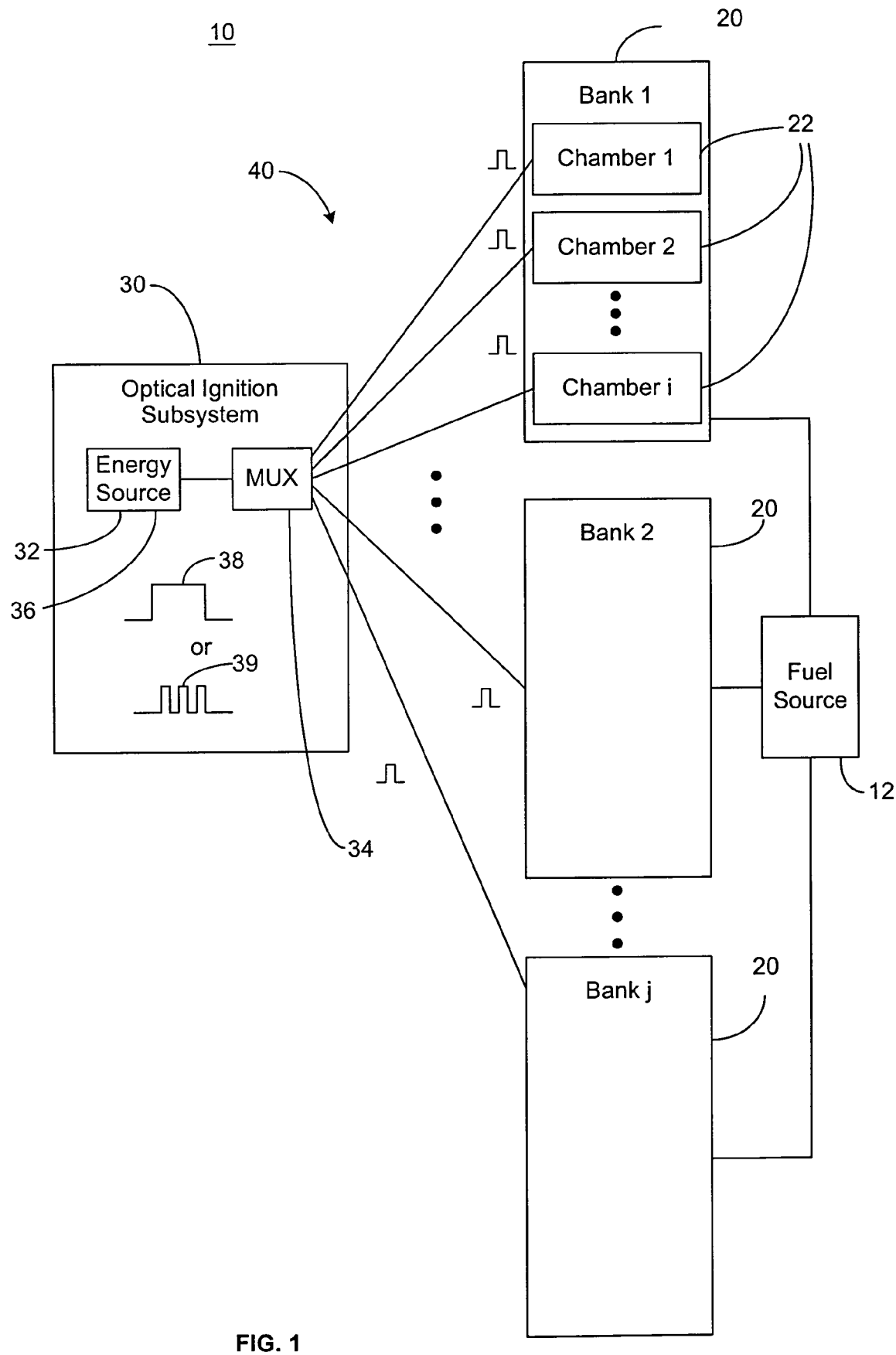
FIG. 1 is a block diagram of a pulse detonation wave engine detonation system in accordance with the present invention.

Reference will now be made in detail to the present preferred embodiments of the invention, examples of which are illustrated in the accompanying drawings. Wherever possible, the same reference numerals will be used throughout the drawings to refer to the same or like parts.

FIG. 1 shows a pulse detonation wave engine (PDWE) detonation system 10 in accordance with the principles of the present invention. Generally, the detonation system 10 can be used in various military and aerospace propulsion systems. These propulsion systems include but are not limited to large boost engines, smaller upper stage engines, and missile systems. Specifically, the detonation system 10 has a plurality of detonation banks 20 where each detonation bank 20 has a plurality of detonation chambers 22 for receiving a fuel/oxidizer mixture from a propellant source 12. The chambers 22 are preferably standard tubes as described in U.S. Pat. No. 5,937,635 to Winfree et. al., incorporated herein by reference. An optical ignition subsystem 30 generates a plurality of optical pulses, where the optical pulses ignite each fuel/oxidizer mixture such that the chambers 22 detonate in a desired order. An optical transport subsystem 40 transports the optical pulses from the ignition subsystem 30 to the chambers 22. It is important to note that while the banks 20 and chambers 22 are shown as being identical, many varying sizes, volumes, and configurations are possible without parting from the spirit and scope of the invention.

The ignition subsystem 30 preferably includes an optical energy source 32 for generating optical energy at a predetermined intensity level to be described in greater detail below. An optical multiplexing device 34 separates the optical energy such that the optical energy sequentially detonates the banks 20 and simultaneously detonates the chambers 22 within each bank 20. The ignition subsystem 30 further includes an optical interface 36 for optically coupling the energy source 32 to the multiplexing device 34. While the preferred optical interface 36 is an optical fiber, any medium in which light can travel may be used.

It will be appreciated that the energy source 32 can generate either a single pulse 38 of the optical energy, or a plurality of pulses 39. Where the energy source 32 generates a single pulse 38 of the optical energy, the multiplexing device 34 divides the single pulse 38 into a plurality of pulses and routes the pulses to the chambers 22. Where the energy source 32 generates a plurality of pulses 39 of the optical energy, the multiplexing device 34 routes the pulses directly to the chambers 22. While the energy source 32 is preferably a laser, any source of optical energy having the appropriate intensity and wavelength properties may be used.

It will further be appreciated that the optical energy generated by the energy source 32 can drive each fuel/oxidizer mixture into either a self-initiating chemical admixture (which can begin the combustion reaction.) The equation governing the optical intensity to drive the optical breakdown is given by $$I_{cr} = \{[mcE_I(1+(\omega\tau)^2)]/[2\pi e^2\tau]\}[g+1/\tau_p \log_e(\rho_{cr}/\rho_0)]$$

where $\rho_{cr}$ is the critical electron number for breakdown, $\tau_p$ is the laser pulsewidth, m, E, c are the electron constants, $\omega$ is the optical field frequency, $E_I$ is the ionization energy of the fuel/oxidizer or oxidizer, $\tau$ is the momentum transfer collision time, g is the electron loss rate, and $\rho_0$ is the "initial" electron density. Although this equation depends strongly on the particular characteristics of the medium, optical systems capable of delivering this level of intensity to the combustion chambers 22 are commercially available. Once a finite number of fuel and/or oxidizer molecules have been dissociated, the resulting physical state is an optically opaque medium. All the subsequent energy in the laser pulse is absorbed into the medium. The optical spot size is a function of the intensity at which the fuel and/or oxidizer molecules break down. The amounts of energy per unit volume necessary for initiation to occur are known in the art from both an analytical and an experimental viewpoint.

Specifically, the energy density required for obtaining a self-initiating condition within a PDWE is well understood. The energy densities reported and confirmed are on the order of $10^9$ J/m$^3$. While this number initially appears to be unobtainable with available systems, the nature of optical delivery allows the energy requirement to be reduced to a few milli-Joules energy. Specifically, optical delivery allows the energy to be deposited into a very small volume, such as on the order of 100 micron cubes. The only further physical requirement is that the optical pulse peak intensity be high enough to allow non-linear optical absorption within the fuel/oxidizer mixture to occur. In this manner, most of the optical pulse energy will be deposited within the combustion media. Through the use of non-linear optical absorption, enough free electrons can be created within the high-intensity focus region to allow the mixture to take on the absorption characteristics of a plasma. Plasmas range from highly absorbing to completely opaque, allowing for a finite fraction of the pulse energy to be absorbed by the medium. This will allow straightforward engineering design and application of the present invention to the sorts of fuel/oxidizer combinations that one would encounter in a PDWE.

Figure 2:
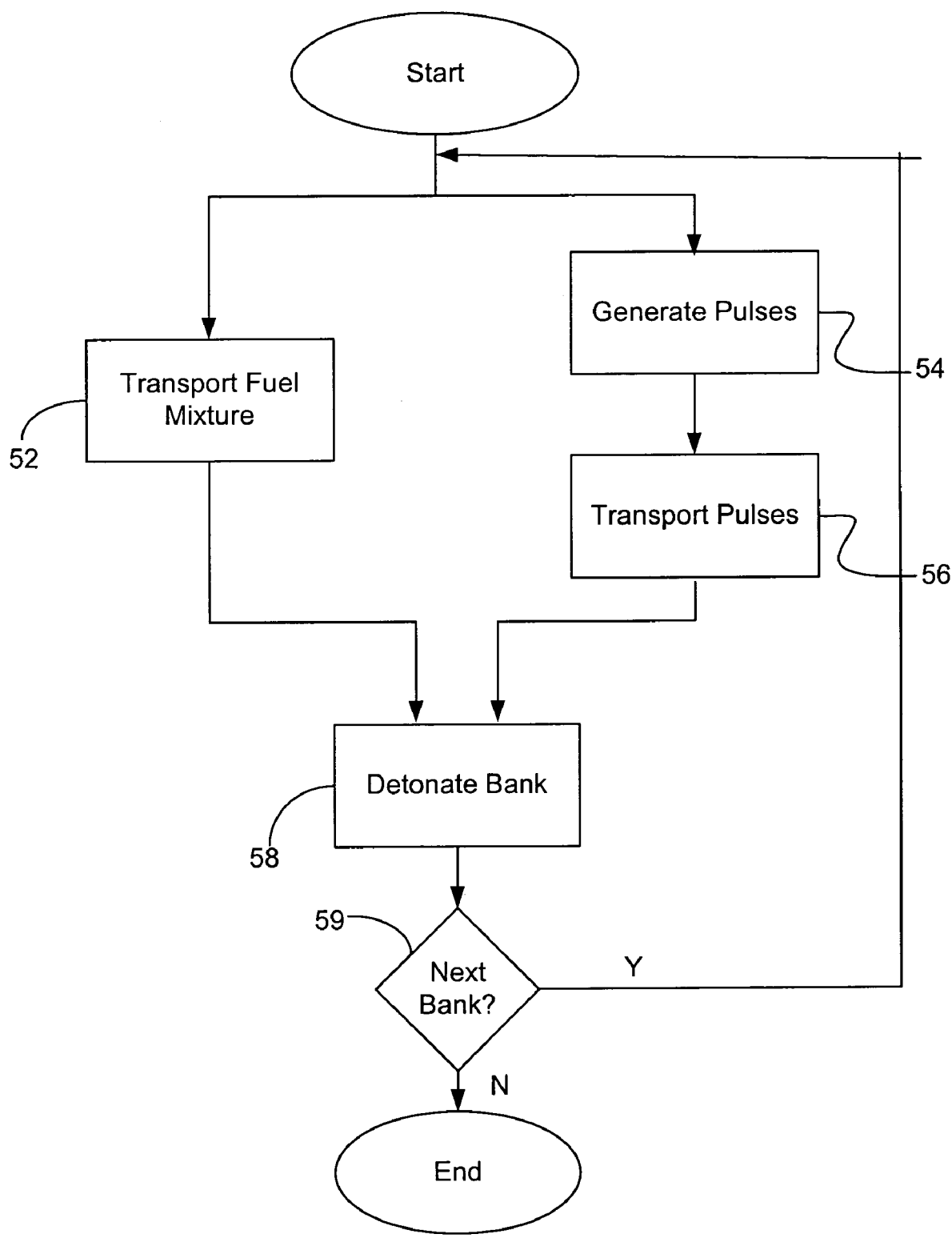
FIG. 2 is a flowchart of a method for detonating a pulse detonation wave engine in accordance with the present invention.

Turning now to FIG. 2, a method 50 for detonating a PDWE is shown. Specifically, it can be seen that at step 52, a fuel/oxidizer mixture is transported from a propellant source to a plurality of detonation banks, where each detonation bank has a plurality of detonation chambers. At step 54 a plurality of optical pulses are generated. The optical pulses are transported to the chambers at step 56, where the optical pulses ignite each fuel/oxidizer mixture such that the chambers detonate in a desired order. Thus, steps 58 and 59 allow the banks to be detonated sequentially, while the chambers within each bank are detonated simultaneously. While optics have been used to ignite non-PDWE propulsion systems, the present invention provides specific advantages that are unique to the PDWE. For example, the ability to ignite chambers in a desired order is significantly reduced without the pulsed timing capabilities of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A pulse detonation wave engine detonation system comprising:
a plurality of detonation banks, each detonation bank having a plurality of detonation chambers for receiving a fuel/oxidizer mixture from a fuel/oxidizer source;
an optical ignition subsystem independent of, and positioned apart from, the detonation banks for generating a plurality of optical pulses, the optical pulses igniting each fuel/oxidizer mixture such that the chambers detonate in a desired order;
an optical transport subsystem for transporting the optical pulses from the optical ignition subsystem to the chambers in a repeated fashion; and
an optical multiplexing device configured for separating optical energy such that the optical energy sequentially detonates the banks and simultaneously detonates the chambers within each bank.

2. The detonation system of claim 1 wherein the optical ignition subsystem includes:
   an optical energy source for generating the optical energy at a predetermined intensity level; and
   an optical interface for optically coupling the energy source to the multiplexing device.

3. The detonation system of claim 2 wherein the energy source generates a single pulse of the optical energy, the multiplexing device dividing the single pulse into a plurality of pulses and routing the pulses to the chambers.

4. The detonation system of claim 2 wherein the energy source generates a plurality of pulses of the optical energy, the multiplexing device routing the pulses to the chambers.

5. The detonation system of claim 2 wherein the energy source is a laser.

6. The detonation system of claim 1 wherein the optical transport subsystem includes a plurality of optical fibers.

7. The detonation system of claim 1 wherein the optical energy drives each fuel/oxidizer mixture into a self-initiating chemical admixture.

8. The detonation system of claim 1 wherein the optical pulses are generated in accordance with a predetermined optical intensity equation.

9. The detonation system of claim 8 wherein the optical intensity equation is defined by a formula comprising:

$$I_{cr} = \{[mcE_1(1+(\omega\tau)^2)]/[2\pi e^2\tau]\}[g+1/\tau_p \log_e(p_{cr}/p_o)]$$

where $p_{cr}$ is the critical electron number for breakdown, $\tau_p$ is the laser pulsewidth, m, E, c are the electron constants, $\omega$ is the optical field frequency, $E_I$ is the ionization energy of the fuel/oxidizer or oxidizer, $\tau$ is the momentum transfer collision time, g is the electron loss rate, and $p_o$ is the "initial" electron density.

10. The detonation system of claim 1 wherein the optical multiplexing device separates the optical energy such that the optical energy sequentially detonates the banks and simultaneously detonates the chambers within each bank.

11. An optical ignition subsystem for a pulse detonation wave engine detonation system, the ignition subsystem including:
    an optical energy source for generating optical energy at a predetermined intensity level;
    an optical multiplexing apparatus configured for multiplexing the optical energy such that the optical energy sequentially detonates banks of the detonation system and simultaneously detonates chambers contained within each bank, where the detonation banks are positioned independently of and apart from the optical ignition subsystem;
    an optical interface for optically coupling the energy source to the multiplexing apparatus; and
    an optical transport subsystem for transporting the optical energy from the optical multiplexing apparatus to the chambers in a repeated fashion.

12. The ignition subsystem of claim 11 wherein the energy source generates a single pulse of the optical energy, the multiplexing apparatus dividing the single pulse into a plurality of pulses and routing the pulses through the optical transport subsystem to the chambers.

13. The detonation system of claim 11 wherein the energy source generates a plurality of pulses of the optical energy, the multiplexing apparatus routing the pulses to the chambers.

14. The ignition subsystem of claim 11 wherein the energy source is a laser.

15. The ignition subsystem of claim 11 wherein the optical energy detonates the chambers by igniting a fuel/oxidizer mixture from a fuel/oxidizer source such that the chambers detonate in a desired order.

16. The ignition subsystem of claim 15 wherein the optical energy drives each fuel/oxidizer mixture into a self-initiating chemical admixture.

17. The ignition subsystem of claim 11 wherein the optical transport subsystem includes a plurality of optical fibers.

18. The ignition subsystem of claim 11 wherein the optical energy is generated in accordance with a predetermined optical intensity equation.

19. The ignition subsystem of claim 18 wherein the optical intensity equation is defined by the formula comprising:

$$I_{cr} = \{[mcE_1(1+(\omega\tau)^2)]/[2\pi e^2\tau]\}[g+1/\tau_p \log_e(p_{cr}/p_o)]$$

where $p_{cr}$ is the critical electron number for breakdown, $\tau_p$ is the laser pulsewidth, m, E, c are the electron constants, $\omega$ is the optical field frequency, $E_I$ is the ionization energy of the fuel/oxidizer or oxidizer, $\tau$ is the momentum transfer collision time, g is the electron loss rate, and $p_o$ is the "initial" electron density.

20. The ignition subsystem of claim 11 wherein the optical multiplexing apparatus separates the optical energy such that the optical energy sequentially detonates banks of the detonation system and simultaneously detonates chambers contained within each bank.

21. A method for detonating a pulse detonation wave engine, the method comprising the steps of:
    transporting a fuel/oxidizer mixture from a propellant source to a plurality of detonation banks, each detonation bank having a plurality of detonation chambers;
    generating a plurality of optical pulses, the optical pulses igniting each fuel/oxidizer mixture such that the chambers detonate in a desired order;
    transporting the optical pulses to the chambers in a repeated fashion, where the optical pulses are generated by an optical ignition subsystem positioned independently of, and apart from, the chambers;
    generating optical energy; and
    separating the optical energy such that the optical energy sequentially detonates the banks and simultaneously detonates the chambers within each bank.

22. The method of claim 21 further including the step of:
    generating the optical energy at a predetermined intensity level.

23. The method of claim 22 further including the steps of:
    generating a single pulse of the optical energy; and
    dividing the single pulse into a plurality of pulses.

24. The method of claim 22 further including the step of generating a plurality of pulses of the optical energy.

25. The method of claim 21 further including the step of driving each fuel/oxidizer mixture into a self-initiating chemical admixture.

* * * * *